United States Patent [19]

Hibi et al.

[11] 3,926,441

[45] Dec. 16, 1975

[54] STYLUS SHOE SUSPENSION ARRANGEMENT FOR A PHONOGRAPH PICKUP CARTRIDGE

[75] Inventors: Tadatoshi Hibi; Keniti Okura, both of Fukuroi, Japan

[73] Assignee: Pioneer Electronic Corporation, Tokyo, Japan

[22] Filed: May 14, 1974

[21] Appl. No.: 469,725

[30] Foreign Application Priority Data

May 15, 1973 Japan ................................ 48-56831

[52] U.S. Cl. .................................................. 274/37
[51] Int. Cl.²........................................... G11B 3/02
[58] Field of Search ......... 274/37, 179/100.41 K, 179/100.41 M

[56] References Cited

UNITED STATES PATENTS

| | | | |
|---|---|---|---|
| 3,146,319 | 8/1964 | Stanton | 179/100.41 K |
| 3,215,785 | 11/1965 | Cvetko et al. | 179/100.41 K |
| 3,469,040 | 9/1969 | Shaper | 179/100.41 K |
| 3,641,284 | 2/1972 | Westerkamp et al. | 179/100.41 K |

*Primary Examiner*—Richard E. Aegerter
*Assistant Examiner*—John W. Shepperd
*Attorney, Agent, or Firm*—Sughrue, Rothwell, Mion, Zinn & Macpeak

[57] ABSTRACT

An elastic bearing member provided with a circular cross-section aperture through the center thereof suspends a cylindrical stylus shoe within the circular aperture. A star-shaped tapered recess is formed within the surface of the bearing member to the side opposite that of the stylus tip and extends inwardly approximately one-half the thickness of the elastic bearing. A wire coupled at one end to a fixed support rearwardly of the elastic bearing has the other end fixed to the shoe periphery at the point where the upper star point base merges with the circular aperture receiving the shoe to limit axial shifting of the stylus.

4 Claims, 8 Drawing Figures

STYLUS SHOE SUSPENSION ARRANGEMENT FOR A PHONOGRAPH PICKUP CARTRIDGE

BACKGROUND OF THE INVENTION

1. Field of the Invention

This invention relates to a phonograph pickup cartridge, and more particularly, to an improved suspension arrangement for a stylus shoe.

2. Description of the Prior Art

In a conventional pickup cartridge, for example, of the moving magnet type, as shown in FIGS. 1–3 inclusive, a stylus shoe 12 which is in the form of a rod has a stylus tip 11 mounted at its forward end on a slightly inclined terminal portion, and is provided at its opposite end with a magnet 14. The stylus shoe 12 is suspended by means of an elastic bearing 13, which may be composed of a cylindrical or cubic elastic material mass having a cylindrical aperture in the center thereof through which the rod-like stylus shoe 12 projects, the elastic bearing 13 being provided with a thickness B. The resulting suspension structure formed in this manner results in deterioration of the frequency characteristic during transducer use, or the decline of the output voltage in the high pitch tone range, since the elastic bearing 13 provides excessive motion dampening and restoring effects to the magnet 14, since the stylus shoe makes full peripheral contact with the circular aperture within the elastic bearing for the complete thickness B of said bearing. Where the thickness of the elastic bearing is made thinner as is seen in FIG. 3, for reducing the motion damping effect, the center of the elastic bearing 131 in this case changes configuration and curves from its planar form because the stylus shoe 121 is pulled in the direction of arrow 17 during sound reproduction from the phonograph record. Therefore, a reproduced signal is distorted and the frequency characteristics are even more undesirable because the fulcrum position of the stylus shoe changes randomly.

The present invention eliminates the aforementioned defects. A primary object of the present invention is to provide a novel suspension arrangement including the bearing structure for a stylus shoe wherein the elastic bearing member is provided with a circular cross-section aperture for a portion of its thickness and is further provided with a star-like recess within the side of the elastic bearing opposite that facing the stylus tip which is coaxial with the circular aperture and acts as an extension of the same to thereby achieve superior frequency characteristic for the phonograph pickup cartridge which supports the stylus shoe.

The bearing member is of polygonal shape at right angles to the axis to the stylus shoe receiving aperture, preferably being cubic, and the star-shaped recess has points corresponding in number to the corners of the polygonal bearing member, with the points of the star-shaped recess being aligned with the corners of the bearing member. Preferably, the points taper outwardly from the circular aperture towards the rear face with the tips terminating short of the aligned corners. A wire coupled at one end to a fixed support rearwardly of the elastic bearing means has its other end fixed to the shoe periphery at the point where the star-shaped recess merges with the circular aperture to restrict axial movement of the stylus shoe.

DESCRIPTION OF THE PREFERRED EMBODIMENT

Figure 1:
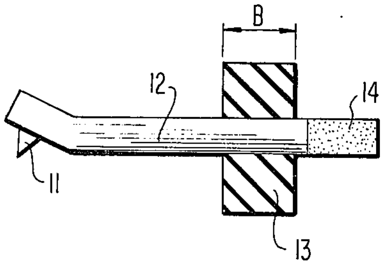
FIG. 1 (PRIOR ART)
FIG. 1 is a front view, partially in section of a stylus shoe suspended by a conventional elastic bearing.
Figure 2:
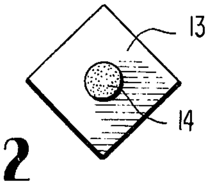
FIG. 2 (PRIOR ART)
FIG. 2 is a right side view of the stylus shoe suspension arrangement of FIG. 1.
Figure 4:
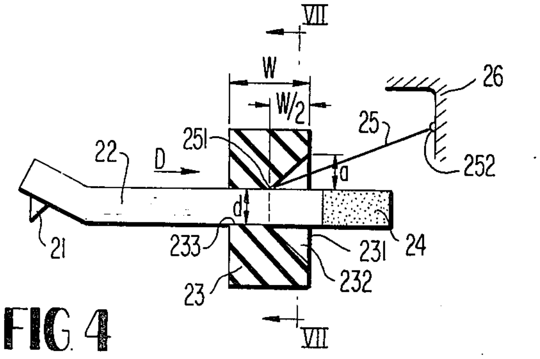
FIG. 4 is a front view, partially in section, of the stylus shoe suspension arrangement of the present invention.
Figure 5:
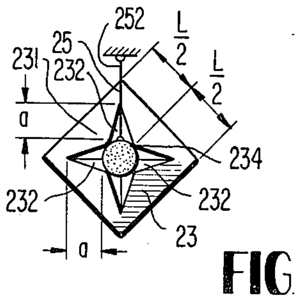
FIG. 5 is a right side view of the suspension arrangement of FIG. 4.
Figure 6:
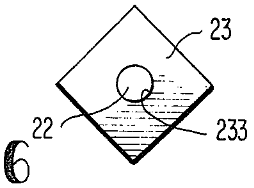
FIG. 6 is a side view of the suspension arrangement of FIG. 4 from the side opposite that of FIG. 5.
Figure 8:
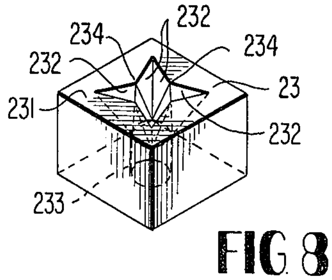
FIG. 8 is a perspective view of the elastic bearing forming the principal suspension member of the arrangement of FIG. 4.
Figure 7:
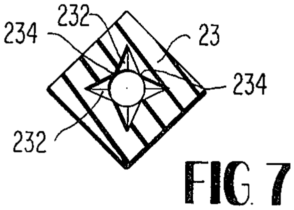
FIG. 7 is a longitudinal cross-sectional view of the suspension arrangement of FIG. 4 taken about line VII — VII.

One preferred embodiment of the present invention will now be explained in accordance with the accompanying drawings. In FIG. 4, a stylus shoe 22 which is essentially the same as the stylus shoe 12 of the prior art arrangement of FIG. 1, is provided with a stylus tip 21 at the forward end of the shoe and a magnet 24 mounted at the rear end of the stylus shoe. An elastic bearing or member 23 which is essentially cubic in configuration at right angles to the longitudinal axis of the stylus shoe 22 and is essentially identical in configuration in that respect to the elastic bearing member 13 of the prior art device of FIGS. 1 and 2, differs materially from the prior art arrangement. In this respect, the bearing member 23 is provided with a circular aperture 233 which extends approximately one-half the width W of the bearing member 23, from the front or forward face 251 of that member, while the rear face is provided with a star-shaped recess 232 from the rear surface 231 inwardly, approximately onehalf the thickness of W and merging with the circular aperture 233. The rod-like stylus shoe 22 is received within aperture 233 with the rear end projecting away from the rear surface 231 and being surrounded by recess 232. The star-shaped recess 232 is provided with a number of points corresponding in number to the corners of the polygonal bearing member 23 and are in alignment with the corners of the bearing member 23, that is, the points of the starshaped recess 232 project outwardly from the circular aperture 233 in a radial direction such that they terminate with their points at the rear surface 231 short of the corner of the cube-shaped bearing member 23. Thus, the apex of the star-shaped aperture points 232 which face the corresponding corners of the square rear surface of the elastic bearing 23 extend to a height identified at a FIGS. 4 and 5 at the rear surface 231. The points of the star-shaped aperture taper rearwardly from their merging points at their base with the circular aperture 233 such that the height of the apex of the star-shaped recess point becomes less and less in moving from the rear plane or rear surface 231 towards the front surface 251 and zero out at a position approximating the center in the longitudinal direction of the stylus shoe 22, that is at about one-half W. Thus, the four inside corners 234 of the star-shaped recess make contact with the surface of the stylus shoe 22 to suspend the stylus shoe at this point and forwardly of this point by the circular aperture 233. Thus, the motion damping effect of the bearing member 23 may be readily changed by changing the form of the star-shaped recess 232, for example, the height of the apex and thus the rearwardly tapered angle of the points of the star-like recess may be varied to achieve this end. The fulcrum of the stylus shoe never moves forward and backward during the sound reproduction from the phonograph record (not shown) which the stylus contacts, because the stylus shoe is retained rearwardly by tension which is exerted rearwardly and somewhat upwardly by wire 25 which is secured to the periphery of the stylus rod 22 adjacent the merging point of the star-shaped recess 232 and aperture 233.

Figure 3:
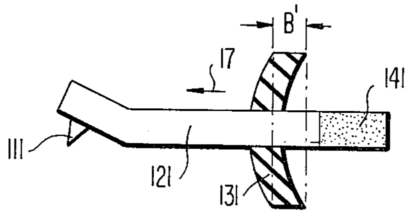
FIG. 3 (PRIOR ART)
FIG. 3 is a front view, partially in section, of a conventional stylus shoe suspension employing a thin elastic bearing.

As described above, the suspension arrangement of the present invention for the stylus shoe for use within a phonograph pickup cartridge may be made proper in terms of adjustability of the motion damping and restoring effects for the stylus shoe and therefore, it is possible to achieve stylus support systems having extremely high stylus compliance. As a result, the pickup cartridge achieves improved over-all performance when compared to similar devices such as the illustrated prior art devices of FIGS. 1–3. In particular, a very low tracking force and good channel reproduction is achieved.

Although there has been described a preferred embodiment of this invention, many variations and modifications may be apparent to those skilled in the art. Therefore, this invention is to be limited not by the specific disclosure herein, but only by the appending claims.

We claim:

1. In a suspension arrangement for a stylus shoe for a phonograph pickup cartridge including a fixed support, said suspension arrangement including an elastic bearing having a circular cross section aperture which receives a rod-like stylus shoe extending therethrough, the improvement wherein:

said circular aperture extends approximately one-half the thickness of the elastic bearing at the center thereof from the front of the elastic bearing member in terms of the stylus tip, towards the rear surface thereof, a star-shaped recess is provided within the rear surface of the elastic bearing member emanating from and coaxial with said circular aperture and having points tapering radially outwardly toward the rear face of said elastic bearing member, the radially inside corners of said star-shaped recess contact and support said stylus shoe from said circular aperture to the rear end face of the bearing member, and a wire coupled at one end to said fixed support rearwardly of the elastic bearing member and to the side of the rod-like stylus shoe and the other end fixed to said shoe at a point where the star-shaped recess merges with the circular aperture with said wire inclined relative to the axis of the rod-like stylus shoe and aligned with one apex of said star-shaped recess such that the resulting wire tension maintains the vibration fulcrum of the stylus shoe at the center of the elastic bearing to effectively prevent the resonant vibration of said stylus shoe.

2. The stylus shoe suspension arrangement as claimed in claim 1, wherein: said bearing member is of regular polygonal shape at right angles to the aperture axis, said star-shaped recess includes points equal in number to the corners of the polygonal elastic bearing member and being aligned therewith.

3. The stylus shoe suspension arrangement as claimed in claim 2, wherein: the points of the star-shaped recess taper outwardly toward the rear face of the elastic bearing member with their tips terminating short of the aligned corners thereof.

4. The stylus shoe suspension arrangement as claimed in claim 1, wherein: the points of the star-shaped recess taper outwardly toward the rear face of the elastic bearing member with their tips terminating short of the bearing periphery.

* * * * *